United States Patent
Lee et al.

(10) Patent No.: US 9,737,888 B2
(45) Date of Patent: Aug. 22, 2017

(54) PROXIMAL DEGAS DRIVEN MICROFLUIDIC ACTUATION

(71) Applicant: THE REGENTS OF THE UNIVERSITY OF CALIFORNIA, Oakland, CA (US)

(72) Inventors: Luke P. Lee, Orinda, CA (US); Debkishore Mitra, Berkeley, CA (US); John R. Waldeisen, Berkeley, CA (US); Jixiao Liu, Albany, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/947,893

(22) Filed: Nov. 20, 2015

(65) Prior Publication Data

US 2016/0144362 A1    May 26, 2016

Related U.S. Application Data

(63) Continuation of application No. PCT/US2014/039333, filed on May 23, 2014.

(Continued)

(51) Int. Cl.
*G01N 3/00* (2006.01)
*B01L 3/00* (2006.01)
*B01D 19/00* (2006.01)

(52) U.S. Cl.
CPC .... *B01L 3/502723* (2013.01); *B01D 19/0031* (2013.01); *B01L 3/50273* (2013.01);
(Continued)

(58) Field of Classification Search
CPC .. B01L 3/00; B01L 3/502723; B01L 3/50273; B01D 19/0031
(Continued)

(56) References Cited

U.S. PATENT DOCUMENTS

2004/0208792 A1* 10/2004 Linton .................. B01L 3/5025
422/552
2005/0266582 A1   12/2005 Modlin et al.
(Continued)

FOREIGN PATENT DOCUMENTS

WO    2009-082535 A2    7/2009

OTHER PUBLICATIONS

Korean Intellectual Property Office (KIPO), International Search Report and Written Opinion, PCT/US2014/039333, issued Sep. 26, 2014, pp. 1-10, with claims searched, pp. 11-14. Counterpart to the application filed herewith.

(Continued)

*Primary Examiner* — Brian J Sines
(74) *Attorney, Agent, or Firm* — O'Banion & Ritchey LLP; John P. O'Banion

(57) ABSTRACT

An apparatus with a self-contained, tunable, microfluidic pumping system that utilizes the high air permeability of the matrix material to actuate fluid flow in a network of fluidic microchannels and microstructures is provided. The pumping relies upon partial evacuation of degas/vacuum channels that are located next to the fluid channels to degas air from the fluid channels or structures producing a reduction of pressure in the fluidic channel leading to the flow of fluid from an inlet at atmospheric pressure through the device. The solution is isolated from the pumping apparatus since the liquid does not pass through the diffusion barriers. The apparatus and method can also provide bubble-free microfluidic pumping, without any auxiliary equipment or device pre-treatment, and can fill dead-end channels and chambers, providing a powerful liquid handling tool for a broad range of applications.

8 Claims, 5 Drawing Sheets

Related U.S. Application Data

(60) Provisional application No. 61/826,982, filed on May 23, 2013.

(52) U.S. Cl.
CPC . *B01L 2200/0684* (2013.01); *B01L 2300/069* (2013.01); *B01L 2300/0816* (2013.01); *B01L 2300/0858* (2013.01); *B01L 2300/0883* (2013.01); *B01L 2300/10* (2013.01); *B01L 2300/12* (2013.01); *B01L 2300/123* (2013.01); *B01L 2400/049* (2013.01); *B01L 2400/0481* (2013.01); *B01L 2400/0605* (2013.01); *B01L 2400/0638* (2013.01); *B01L 2400/0694* (2013.01)

(58) Field of Classification Search
USPC ......... 422/502, 503, 504, 505, 68.1; 436/43, 436/180, 55
See application file for complete search history.

(56) References Cited

U.S. PATENT DOCUMENTS

| | | | |
|---|---|---|---|
| 2006/0108012 A1 | 5/2006 | Barrow et al. | |
| 2009/0165876 A1* | 7/2009 | Atkin | B01L 3/502723 137/825 |
| 2011/0103176 A1 | 5/2011 | Van Dam et al. | |
| 2012/0245042 A1* | 9/2012 | Liu | B01L 3/502723 506/7 |
| 2012/0301903 A1 | 11/2012 | Putnam et al. | |
| 2013/0045144 A1* | 2/2013 | Perozziello | F16K 99/0015 422/502 |
| 2013/0171679 A1* | 7/2013 | Lee | C12M 23/16 435/29 |
| 2013/0203634 A1* | 8/2013 | Jovanovich | B01L 3/502738 506/26 |
| 2013/0294981 A1* | 11/2013 | Takahashi | B01L 3/56 422/502 |
| 2014/0090735 A1* | 4/2014 | Hung | G01N 33/5008 137/829 |

OTHER PUBLICATIONS

Kolnik et al., "Vacuum-assisted cell loading enables shear-free mammalian microfluidic culture", Lab on a Chip, DOI: 10.1039/c2lc40569e, Aug. 24, 2012, pp. 1-6.

Hokosawa et al., "Power-free poly(dimethylsiloxane) microfluidic devices for gold nanoparticle-based DNA analysis", Lab Chip, 2004, 4, 181-185, published online May 12, 2004.

Hokosawa et al., "Power-free sequential injection for microchip immunoassay toward point-of-care testing", Lab Chip, 2006, 6, 236-241, published online Dec. 12, 2005.

Dimov et al., "Stand-alone self-powered integrated microfluidic blood analysis system (SIMBAS)", Lab on a Chip, DOI: DOI: 10.1039/c0lc00403k, Dec. 8, 2010, pp. 1-6.

* cited by examiner

PROXIMAL DEGAS DRIVEN MICROFLUIDIC ACTUATION

CROSS-REFERENCE TO RELATED APPLICATIONS

This application is a 35 U.S.C.§111(a) continuation of PCT international application number PCT/US2014/039333 filed on May 23, 2014, incorporated herein by reference in its entirety, which claims priority to, and the benefit of, U.S. provisional patent application Ser. No. 61/826,982 filed on May 23, 2013, incorporated herein by reference in its entirety. Priority is claimed to each of the foregoing applications.

The above-referenced PCT international application was published as PCT International Publication No. WO 2014/190258 on Nov. 27, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED IN A COMPUTER PROGRAM APPENDIX

Not Applicable

BACKGROUND

1. Field of the Disclosure

This disclosure pertains generally to microfluidic devices and pumping schemes, and more particularly to an apparatus and system for microfluidic pumping where the sample fluid is isolated from the pumping mechanism. Two channel networks, the fluidic channel and the degas channel, are located in close proximity to each other and an air concentration gradient created across the two networks generates an in-situ diffusive flux out of the fluidic channel resulting in a fluidic channel pressure reduction causing movement of the fluid.

2. Discussion

Microfluidic technologies promise to significantly improve chemical and biomedical analysis by enabling complex laboratory analysis within highly efficient and disposable devices while minimizing fluid volume and power requirements. However, very few of the advancements in microfluidic technology have been successfully commercialized into functional and practical products for point-of-care testing and on-site environmental monitoring. An essential challenge in accomplishing functional microfluidic devices is the need for reliable fluidic actuation for bubble-free, reliable, stand-alone, autonomous loading of fluids.

For rapid testing applications, the mechanism of fluid actuation of the sample has a significant influence on downstream component performance. Current attempts at integrating biochemical assays into microfluidic systems often require fluid actuation methods with several pumps and reagent reservoirs. Therefore, power-free and portable actuation of biofluids in microfluidic chips is essential to the creation of point of care microfluidic diagnostic devices.

Although many fluidic actuation schemes have been developed for microfluidic devices, most of these methods are either excessively complex, dependent on external power sources eliminating mobility, or are overly simplified and not amenable to the controlled and complicated flow patterns required for the integration of advanced biomolecular assay techniques. The majority of the various pumping methods for fluid transport can be classified as either active or passive fluidic actuation techniques. However, both types of fluidic actuation techniques have systemic limitations.

Pressure-driven pumping can be achieved by either positive or negative pressure, which pushes or pulls fluids through microfluidic systems. The most common techniques used for active fluidic actuation in microfluidic systems are pressure-driven or electrokinetic pumping. These techniques offer a range of flow rates that can be controlled. However, pressure-driven actuation often requires burdensome or expensive external equipment and the scheme is vulnerable to bubble formation that can create large dead volumes as well as oscillatory flow. Additionally, these active pumping mechanisms are generally not suitable for filling up dead-end structures that are attractive for complex quantitative, digitized and multiplexed assays.

The same problems are encountered with the electrokinetic-driven flow, which requires a high voltage (50 V to 1000 V) to be exerted on the integrated electrodes to transport the liquid. This high voltage requirement makes it difficult to miniaturize without off-chip power supplies, and the flow control is not easy due to the variability in material surface properties and the vulnerability of fluid properties. Additionally, air bubbles and heat can develop in electrokinetic flow systems, interfering with liquid manipulation and system operation.

Although these active fluid actuation methods have advantages that make them desirable in some applications, their characteristics restrict their utility in applications where portability is essential, thus use beyond the research laboratory has been limited.

Passive fluid actuation methods have been popular due to their simplicity and reduced dependence on external equipment. The common passive actuation techniques include capillary, gravitational and evaporation-based pumping. Capillary-driven flow is a widely adopted and successful autonomous fluidic actuation method utilized in Lateral Flow Assays (LFAs) and glucose measurement tests. Capillary-driven flow is advantageous when the specific liquid-gas-solid condition can provide sufficient capillary pressure necessary to load the liquid autonomously. However, this method is only used in non-complex, low accuracy applications because it lacks controllability and repeatability in humid settings.

Gravity-driven, evaporation-driven, and droplet-based flow techniques take advantage of physical phenomena, and are highly dependent on environmental conditions that greatly influence reproducibility and reliability. Gravity-driven flow is based on the physical existence of gravity but the devices need pre-priming and sometimes the surface tension dominates in the miniaturized devices leading to inconsistent flows. For the pumping based on surface tension, such as evaporation-induced and droplet-based driven flow, the vulnerability to environmental conditions (temperature, humidity etc.) restricts them to applications and uses at locations that have controlled atmospheric conditions that do not vary during the operation process.

Although passive devices are portable and disposable, these passive actuation techniques often lack tunability, reproducibility and require meticulous device pre-treatment or storage, which limit their employment in devices requiring accuracy and reliability.

Additionally, most of the current actuation techniques involve the direct exposure of the liquid sample to the actuation apparatus. Apart from causing problems with air bubble formation, fluid instabilities, dead volumes and inter-device repeatability, direct exposure of biofluids to the actuation apparatus raises concerns about biosafety especially when dealing with biohazardous fluids.

Accordingly, there is a need for an apparatus and method that has tunable, reproducible, and bubble-free microfluidic pumping without any auxiliary equipment or device pre-treatment and that can fill dead-end channels and chambers for a broad range of applications.

BRIEF SUMMARY

Embodiments of the apparatus generally include three main components: 1) the proximal degas/vacuum channels, 2) the fluidic network, and 3) a means for removing air from the degas/vacuum channels. The fluidic channel and the degas channel networks are located in close proximity to each other but are isolated, separated by gas porous walls. The selectively permeable walls allow gases to pass through while restricting access to the aqueous sample or carrier liquids due to the low surface energy of the porous material. The Proximal Degas-driven Flow (PDF) methods take advantage of the high porosity and air solubility of materials such as PDMS, TPX (polymethylpentene), silicone, rubber, etc. to reduce the pressure inside microfluidic channels using proximal degas vacuum lines, which leads to fluidic actuation within the microfluidic channels.

The air can be evacuated or partially evacuated from the degas channels with a traditional vacuum pump, syringe pump, bulb or other pump type connected to the proximal degas channel system. The vacuum in the proximal degas channels can also be generated using an integrated membrane thumb-pump and a one-way umbrella valve. Upon the actuation of the thumb-pump, air in the vacuum channel is first exhausted through a one-way valve followed by a reduction in channel pressure caused by the elastic relaxation of the thumb-pump membrane.

The fluidic network normally has one or more intake ports and fluidic channels. The fluidic network can also have one or more output ports or dead end channels or chambers. It can be seen that a wide variety of device designs employing PDF can be created with two neighboring channel networks, the fluidic channel and the degas channel, isolated by porous walls.

In use, the input ports for the fluidic channels are loaded with a sample solution and the surrounding proximal degas channels, which are connected to a negative pressure source are partially or fully evacuated. Air within the fluidic channel diffuses out through the porous walls, due to the high air permeability and solubility of the walls, and into the nearby degas channels under the pressure gradient created across the barrier walls. This degassing process leads to a reduction in the fluidic channel pressure and results in the liquid solution flowing into the fluidic channels from the inlet port that is at atmospheric pressure. Air evacuation from the fluidic channel leads to continuous fluid flow into the fluidic channel until either the fluidic channel is completely loaded or a pressure equilibrium is reached. The principle behind this technique allows inherently bubble-free liquid actuation and eliminates any dead-volume within the pumping apparatus. This method also provides microfluidic pumping, without any auxiliary equipment or device pre-treatment, and can fill dead-end channels and chambers.

Since the sample solution is isolated from the pumping apparatus, and is impermeable to the diffusion barrier walls, the system can be used for integrated molecular diagnostics, multiplexing and for pumping biohazardous fluids. For example, the technique is ideal for handling biohazardous fluids avoiding the need for sterilizing the actuators after each run since the fluid sample never comes into contact with any of the pumping machinery. Additionally, the isolation of the fluid sample from the integrated pressure source minimizes oscillations in fluid flow velocity and generates average flow velocities in the range of 0.7 to 8 mm/s in the preferred embodiments of the apparatus.

The effect of different device design parameters on fluid flow with proximal degas flow was also characterized. These parameters included the distance between the proximal degas channels and the fluid network channels (referred to as the proximity), fluid channel geometry, the chamber diameter, and the membrane thickness of the thumb-pump. The simulations suggested that the fluid loading performance could be tuned by varying these parameters, thus achieving a wide range of flow velocities and degas pressures. Experimental results confirmed the simulation models and the capacity for rapid and bubble-free fluid actuation was also demonstrated.

Accordingly, a wide variety of portable microfluidic platforms and diagnostic devices can be designed that can be actuated at the point of care without the need for large, expensive and power consuming pumping systems. The device design can also be tuned to achieve a range of flow velocities from this technique and can be operated on demand by using a convenient finger pump. Also, these devices do not require any prior degassing or priming alleviating any need for special device packaging, greatly reducing the cost of the consumable device.

According to one aspect of the technology described herein, an apparatus and system is provided with degas microstructures that are actuated using an external vacuum source such as a mechanical pump or a handheld rubber bulb pump or an integrated on-chip vacuum source such as a membrane thumb pump.

According to another aspect of the technology described herein, a microfluidic proximal degas driven pumping system is provided that has degas microchannel structures and fluidic microchannel structures placed laterally proximal, vertically proximal or obliquely proximal to each other.

A further aspect of the technology described herein is to provide a microfluidic proximal degas driven pumping system where the degas microchannel networks are situated symmetrically or asymmetrically about the fluidic microchannel networks.

Another aspect of the technology described herein is to provide a microfluidic proximal degas driven pumping system with fluidic and degas channels, formed using one homogenous gas permeable matrix or with a laminate of gas permeable or impermeable matrices with a gas permeable barrier in between.

Further aspects of the disclosure will be brought out in the following portions of the specification, wherein the detailed description is for the purpose of fully disclosing preferred embodiments of the apparatus without placing limitations thereon.

BRIEF DESCRIPTION OF THE SEVERAL VIEWS OF THE DRAWINGS

The disclosure will be more fully understood by reference to the following drawings which are for illustrative purposes only.

DETAILED DESCRIPTION

Referring more specifically to the drawings, for illustrative purposes an embodiment of a microfluidic apparatus using microfluidic solution isolated pumping with proximal degas-driven flow with an integrated finger-operated membrane thumb-pump as the on-chip vacuum source is described and depicted generally in FIG. 1A through FIG. 8. It will be appreciated that the methods may vary as to the specific steps and sequence and the apparatus may vary as to elements and structure without departing from the basic concepts as disclosed herein. The method steps are merely exemplary of the order in which these steps may occur. The steps may occur in any order that is desired, such that it still performs the goals of the claimed technology.

Figure 7:
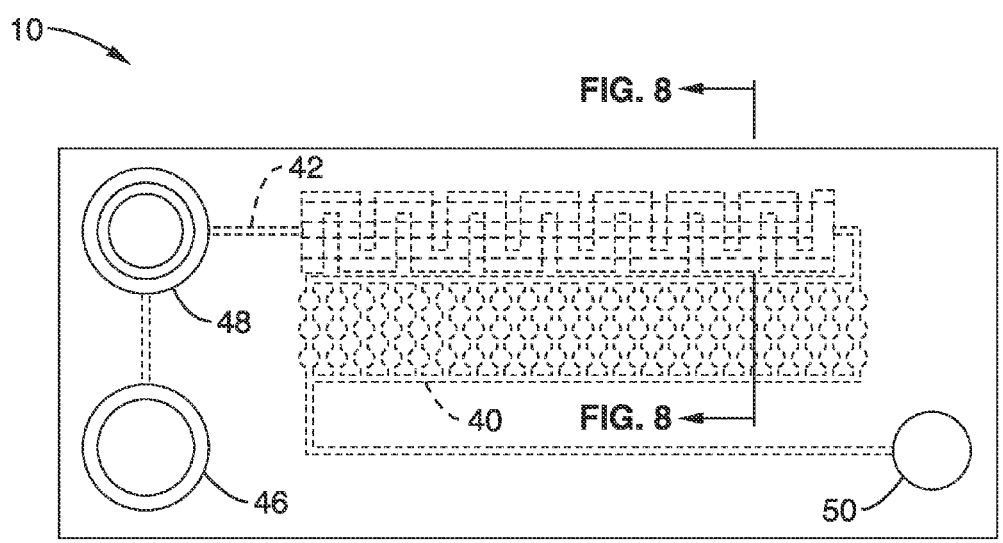
FIG. 7 is a top plan view of an alternative embodiment of a multilayered or laminated microfluidic device with proximal degas-driven flow.
Figure 8:
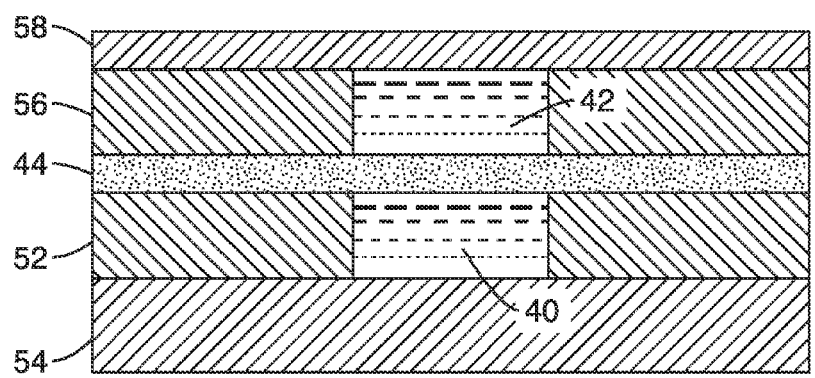
FIG. 8 is a cross-sectional view of a laminate structure taken along the lines FIG. 8-FIG. 8 of FIG. 7.

An illustrative microfluidic apparatus 10 with thumb-pump actuation is shown schematically in FIG. 1A through FIG. 6C. An alternative embodiment is shown in FIG. 7 and FIG. 8. The microfluidic apparatus 10 can operate in a standalone fashion as shown or it can be connected to a number of other fluidic networks of channels and chambers to provide a more complex device. In this illustration, the apparatus 10 is a device with a single input port or inlet 12, a network of fluidic channels 14 connected to the input port 12 and a network of proximal degas channels 16. Although a scheme with single fluidic channels is shown, the fluidic network 14 can include dead end channels and chambers, reaction chambers, divided channels and output ports and other microfluidic structures that may be selected as part of a tailored chip design. A single fluidic channel is used in this illustration for measurement and simulation simplicity.

The fluidic channels 14 and the proximal degas channels 16 are preferably formed in a gas porous matrix of polydimethylsiloxane (PDMS) or other materials like TPX (polymethylpentene), thermoplastic elastomers such as VersaFlex CL-30, or rubber that is preferably placed on a firm substrate 18, made of materials such as glass, acrylic, or cyclic olefin copolymer etc., to support the matrix. However, the substrate 18 may be optional in embodiments without the thumb pump.

Another embodiment of the apparatus includes fluidic channels and degas channels formed in gas impermeable materials, such as COC, acrylic etc., and arranged in a manner such that they are separated by a layer of gas permeable material such as PDMS, silicon, rubber, TPX etc.

PDMS is a flexible elastomeric polymer that is permeable to gases but not liquids and is a preferred material for the gas permeable wall separating the fluidic and degas channels. The porous structure of PDMS allows the transportation of gases between neighboring fluidic 14 and degas channels 16. Although PDMS is hydrophobic with a generally non-reactive surface, exposure to oxygen plasma causes the surface to become hydrophilic and reactive. PDMS can then be successfully bonded to glass, silicon, and to itself by using standard oxygen plasma bonding. Oxygen plasma activated PDMS surfaces can also be bonded to surfaces of hydrocarbon polymers which have been oxygen plasma treated and modified by silane coupling agents such as APTES ((3-Aminopropyl)triethoxysilane).

The ease of patterning microstructures in PDMS makes it a material of choice for the realization of the fluidic and degas channels. Patterning of the porous matrix with channels, microvalves and other microfluidic structures can be accomplished with microfluidic templates to micropattern the polymers. Microcontact printing and other techniques may also be used to design the fluidic networks 14 and degas networks 16.

The fluidic and degas channels can also be formed, using conventional injection molding or hot embossing techniques, in polymeric materials such as COC, acrylic etc. These channels can then be arranged in a manner such that they are separated by a gas permeable wall.

Figure 1A:
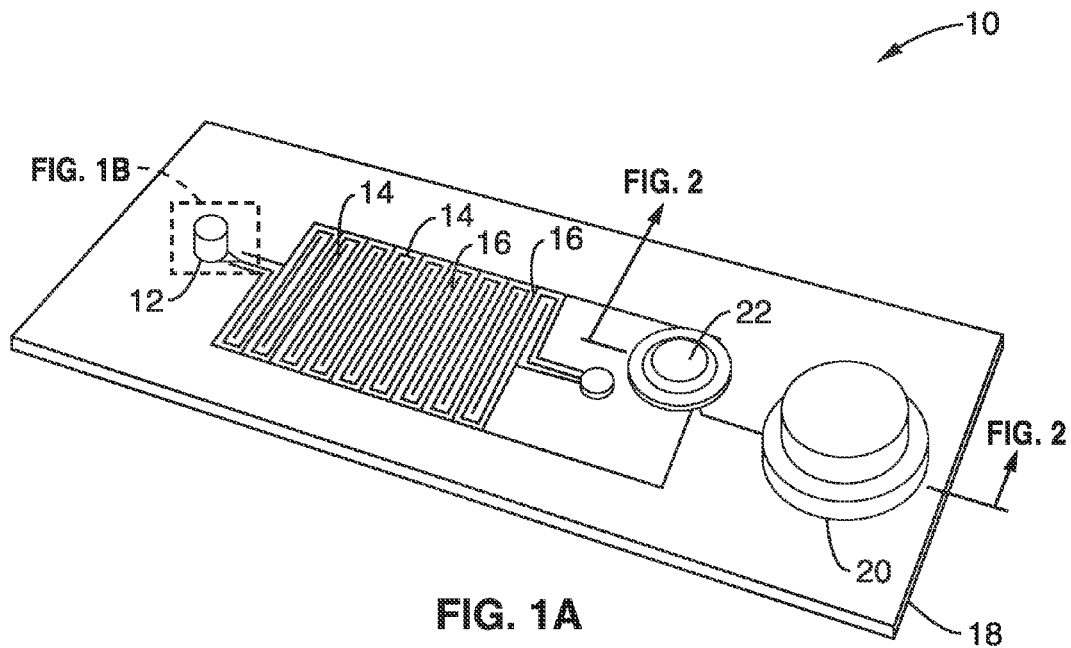
FIG. 1A is a schematic perspective view of one embodiment of a microfluidic chip apparatus with thumb-pump actuation.
Figure 1B:
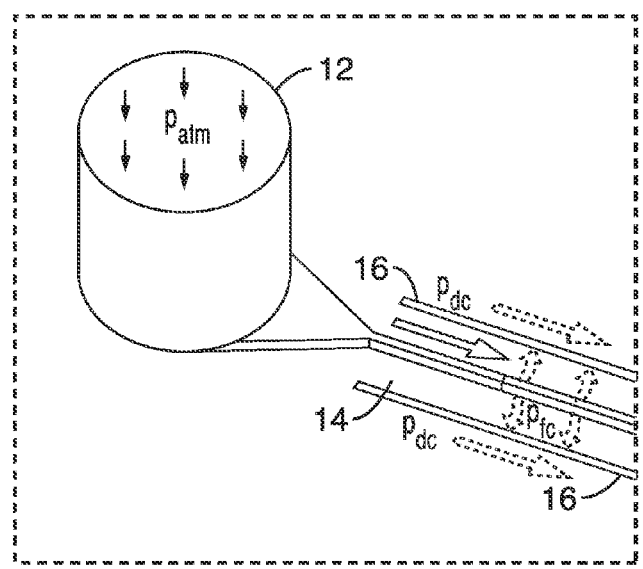
FIG. 1B is a detailed view of the sample input port, fluid flow channel and degas channels of the embodiment illustrated in FIG. 1A.

The sample is introduced into the fluidic network 14 through the input port 12 that is exposed to the atmosphere as shown in detail in FIG. 1B. However, the input port 12 may also be part of a closed system and receive sample material from another module, for example. The degas channel network 16 has channels that are in proximity to but not connected to the fluidic network 14. The degas channel network 16 is a closed system so that the air within the degas network can be partially or fully removed.

The degas channels surround the fluidic channel 14 and dead-end chamber network such that when a relative vacuum is applied within the degas channel network 16, air from the fluidic channel network 14 diffuses into the degas channels across the gas permeable barrier wall layer between the fluidic channel 14 and degas channel networks 16. The air diffusion between these two channel networks causes a pressure difference between atmospheric pressure and the internal channel pressure when the sample liquid is placed at the inlet 12 of the device, thus driving fluid movement into the fluidic channel network 14 while the fluid is kept isolated from the surrounding degas channels 16 by the selective barrier walls.

The air from the degas channels 16 can be fully or partially removed in a variety of ways. In the embodiment shown in FIG. 1A, FIG. 2 and FIG. 3, a thumb-pump is used to create the negative pressure by expelling the gas into atmosphere by a finger pressing and releasing the membrane button 20 and the cooperating elastic check valve 22.

Figure 2:
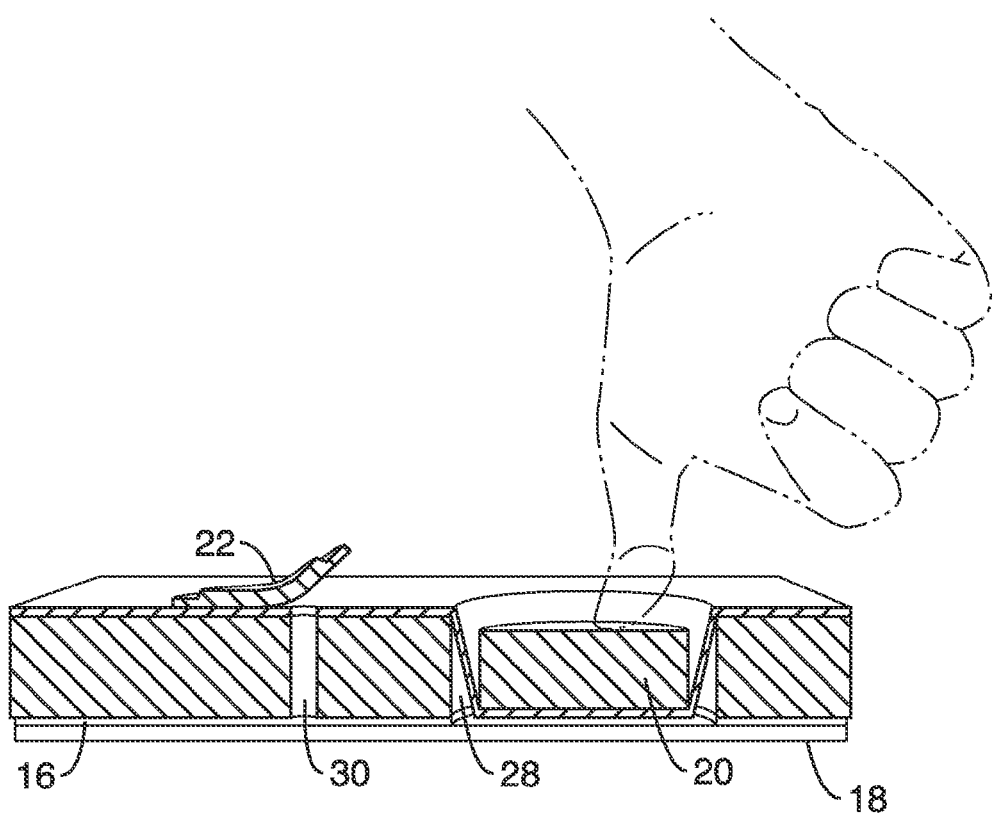
FIG. 2 is a schematic cross-sectional view of the embodiment illustrated in FIG. 1A taken along the lines FIG. 2-FIG. 2 of the apparatus with the thumb-pump fully depressed and check valve open.
Figure 3:
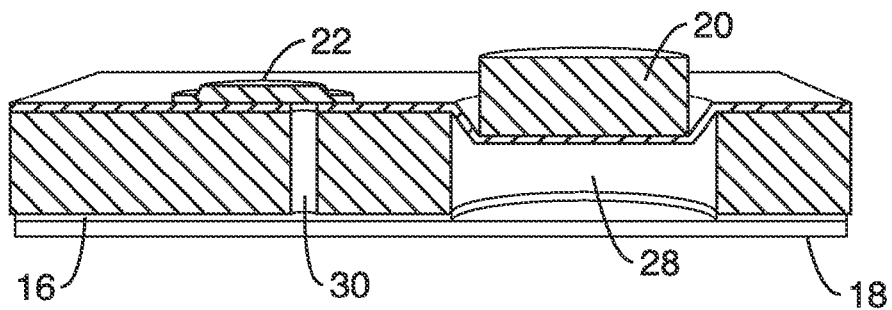
FIG. 3 is a schematic cross-sectional view taken along the lines FIG. 2-FIG. 2 of the apparatus with the thumb-pump and check valve of the embodiment illustrated in FIG. 1A after release of the thumb-pump button.

The operation of the vacuum thumb-pump occurs in three steps as shown in FIG. 2 and FIG. 3. First, the liquid sample is placed at the device inlet 12 as seen in FIG. 1B. Second, the thumb-pump button 20 is pressed, pressurizing the degas channel network and causing the one-way valve 22 (which can be realized using structures such as elastic umbrella valve, elastic duckbill valve, ball check valve etc.) to open and to exhaust air into the atmosphere as shown in FIG. 2. Third, after the button 20 is released, the one-way valve 22 closes automatically, sealing the degas channel network 16 after the air displacement. The elasticity of the thumb-pump chamber 28 provides a restoring force which attempts to restore the volume of the degas channel network 16 close to the original volume thus creating a relative vacuum within the degas channel network 16 as shown in FIG. 3. The one-way valve 22 allows the degas channel network 16 to maintain a relative vacuum and the gas flux created from the concentration gradient across the porous barrier layer degasses air from the fluidic channel network by diffusive transport.

Since the fluidic channel 14 and degas channel networks 16 are isolated from each other, multiple thumb-pump actuations can be performed to maintain the relative vacuum in the degassing channel network without disrupting fluid movement in the fluidic network. The elastic umbrella valve 22 and a button 20 may also be used to ensure identical thumb-pump performance between users. Additionally, the isolation of the sample from the integrated pressure source minimizes oscillations in fluid velocity by adding a systemic capacitance to the fluidic circuitry.

Figure 4:
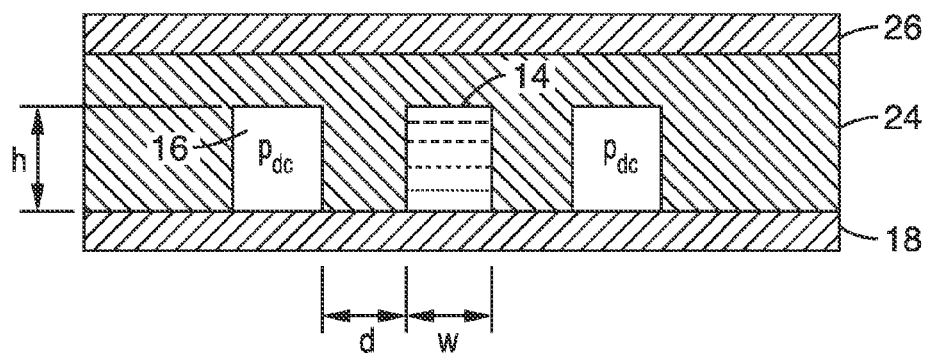
FIG. 4 is a schematic cross-sectional view of an embodiment with a single fluidic channel and two degas channels.
Figure 5:
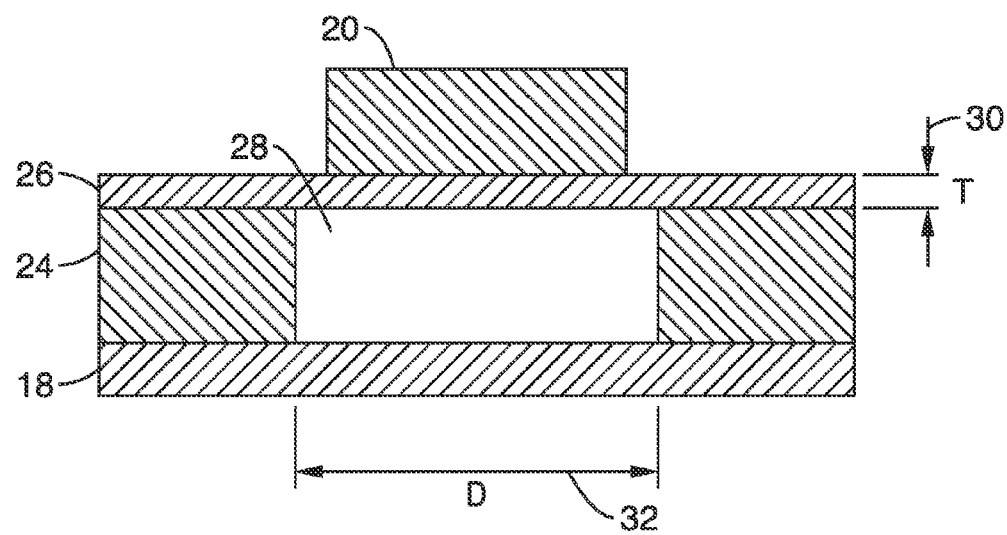
FIG. 5 is a schematic cross-sectional view of the thumb-pump portion of the apparatus before actuation of the thumb-pump.
Figure 6:
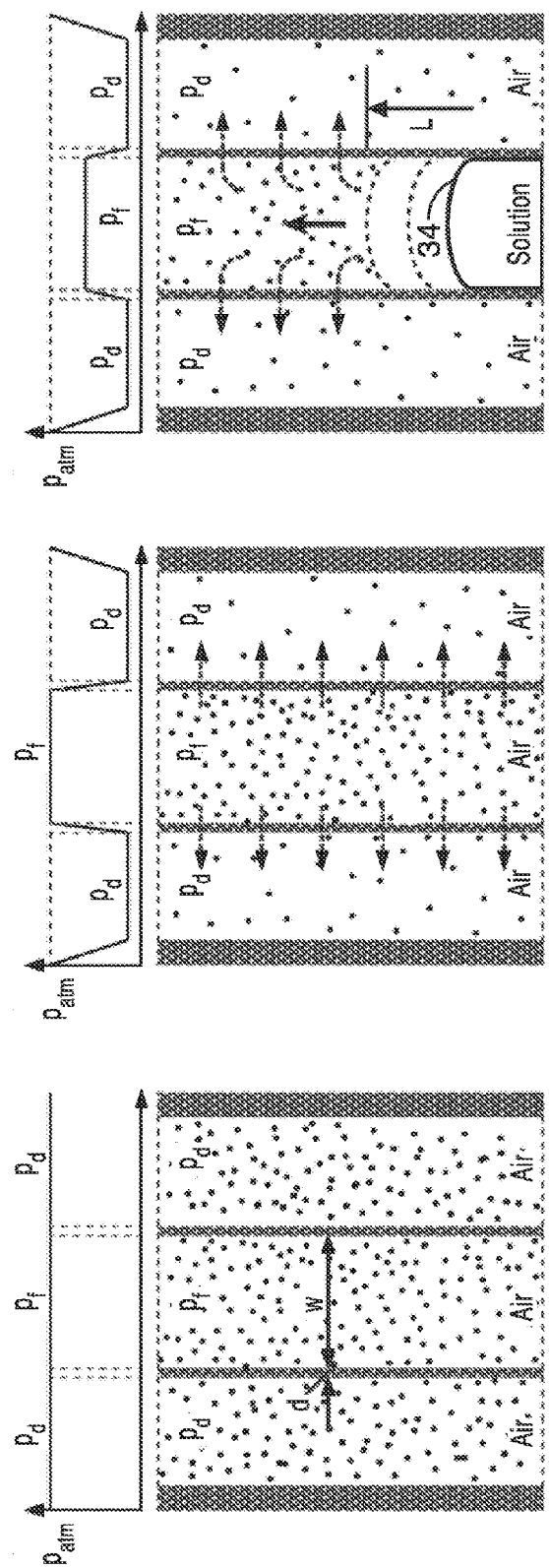
FIG. 6A is a schematic top view of a longitudinal cross-section of fluid and degas channels at the beginning of the PDF process.
FIG. 6B is a schematic top detail view of a longitudinal cross-section of fluid and degas channels after evacuation of the degas channels.
FIG. 6C is a schematic top detail view of a longitudinal cross-section of fluid and degas channels showing fluid flow in the fluid channel.

The performance characteristics of the device 10 can also be controlled by the manipulation of certain dimensions in the design. Turning now to FIG. 4 and FIG. 5, schematic cross-sections of the fluidic network portion and the degas network with membrane pump portion of the apparatus are illustrated.

FIG. 4 depicts the cross section of fluidic channel 14 with selected dimensions and degas channels 16 with selected dimensions, for the embodiment shown in FIG. 1A. The fluidic channels 14 and degas channels 16 are formed in a gas permeable matrix 24. The matrix 24 is mounted to a substrate 18 and may be covered on the top and optionally sides with a non-porous membrane 26.

In another embodiment, the fluidic channels or chambers are formed in a matrix 24, that is gas impermeable like COC, and the degas channels are formed from gas permeable material residing within the fluidic structure so that the fluidic channels and the degas channels are separated by walls made of a gas permeable porous matrix.

Although the degas channels 14 and the fluidic channel 16 are shown in the same plane in FIG. 4, the channels do not need to be in the same plane and can be positioned above or beneath the fluidic channels, for example. The cross-sectional size of the degas channels or fluidic channels can also be different. In one embodiment, a laminate of materials is provided where the fluidic channels 14 are formed as grooves in a non-porous matrix 24 layer that is joined to a porous layer to form the fluidic channels so that there is at least one gas permeable wall. Corresponding degas channels or chambers can be created with or within the porous layer that are evacuated as shown in FIG. 7.

The membrane 26 is preferably a silicone membrane of a suitable thickness for use with a thumb-pump as shown in FIG. 2 and FIG. 5. In the thumb-pump embodiment, the membrane material is preferably resilient, durable and thick enough to have low permeability to air. If a thumb-pump is not used, the membrane 26 can be eliminated or replaced by a material that blocks exposure of the matrix 24 to the atmosphere that is not resilient or of any particular thickness.

If the matrix layer 24 is gas permeable, then its thickness can have effects on the PDF actuation. For the embodiment shown in FIG. 1A and FIG. 4, the preferred PDMS matrix layer 24 has a thickness ranging from approximately 2 mm to approximately 8 mm with a thickness of approximately 4 mm particularly preferred.

The distance "d" between the fluidic and degas channels (also referred to as proximity), channel dimensions and pressures can be varied to produce desired flow rates at different locations on the apparatus 10. For example, the width of the fluidic channel 14 and the proximity between the degas channels 16 and the fluidic channel 14 can be optimized to produce a desired flow rate.

Preferred fluidic channel 14 widths "w" for the embodiment shown in FIG. 1A and FIG. 4 range from approximately 30 µm to approximately 250 µm and heights "h" range from approximately 30 µm to approximately 250 µm. Preferred proximity "d" between fluidic channels or structures and the degas channels range from approximately 50 µm to approximately 400 µm to produce a broad range of flow rates. Relatively thinner walls between fluid and degas channels and smaller channel dimensions will produce comparatively higher flow rates. Thus, fluid loading performance may be tuned by varying these parameters, thereby achieving a wide range of flow velocities and degas pressures.

FIG. 5 depicts a schematic cross section of the thumb-pump chamber showing the thumb-pump chamber 28 formed in the matrix layer 24 bounded by the membrane 26 at the top and the base substrate 18 at the bottom. The two parameters of the membrane pump that were varied for the simulations and experiments, were the thickness 30 of the matrix sealing membrane 26 and the pump chamber diameter ("D") 32. The diameter 32 of chamber 28 and the thickness 30 of membrane 26 are the design parameters that tune degas channel pressures provided by the thumb-pump.

Preferred thickness "T" of the thumb pump silicone elastomeric membrane 30 ranges from approximately 0.05 mm to approximately 1.2 mm. It was observed that the highest flow velocity was achieved with a membrane 26 thickness of 0.8 mm in the pump design shown in FIG. 5.

In addition, an increase in chamber diameter 32 leads to the generation of successively lower vacuum pressures. However, chambers with diameters smaller than 6 mm caused membrane deformation as well as deformation of nearby parts of the chip. Therefore, chamber diameters 32 that are greater than approximately 6 mm are preferred.

Accordingly, the thumb-pump parameters permit design control over the vacuum pressure created in the proximal degas channel network 14 and the air concentration gradient across the two networks generating a diffusive flux of gases out of the fluidic channel 14 to the degas channels 16. This flux results in a pressure reduction in the fluidic channel that drives the liquid solution from inlet 12 into the fluidic channel 14 shown in FIG. 6A-FIG. 6C. Embodiments of the apparatus that use an exterior vacuum source the membrane 26 is optional.

The general sequence of air flow and fluid flow in a fluidic channel 14 is shown in FIG. 6A through FIG. 6C. The initial conditions at the time of loading the solution inlet 12 of the embodiment of FIG. 1A is shown in FIG. 6A. Before exerting the negative pressure in the degas channels 16, both the fluidic channel 14 pressure $P_f$ and the degas channel pressure $P_d$ are equal to the atmospheric pressure $P_{atm}$.

The air from the degas channels 16 is evacuated so the degas channel pressure $P_d$ is below the fluidic channel pressure $P_f$, as shown in FIG. 6B. Preferred vacuum pressures exerted in the degas channels range from approximately −30 kPa to approximately −90 kPa Gauge Pressure. Air starts to diffuse through the air permeable barrier walls from the fluidic channel into the degas channels due to the pressure gradient generated when the degas channel is connected to the negative pressure source represented by the horizontal arrows in FIG. 6B.

At the beginning stage of pumping, the fluidic pressure $P_f$ in the fluidic channel 14 keeps decreasing under the pressure gradient, which will diminish the pressure difference across the barrier. The fluidic channel pressure $P_f$ keeps decreasing under the continuous out flux of air through the walls since the fluidic channel volume is sealed by the liquid plug at the inlet 12.

After overcoming any capillary pinning pressures due to the hydrophobicity of the matrix material, the liquid solution loads into the fluidic channel 14 from inlet 12 by the pressure difference between atmospheric pressure $P_{atm}$ and the pressure within the fluidic channel $P_f$ as shown in FIG. 6C. Additionally, the progression of the liquid meniscus 34 may contribute to fluidic pressure changes as it keeps compressing the air in the fluidic channel 14 and decreases the available surface area for air diffusion. These conditions make the fluidic channel pressure $P_f$ reach an inflection point at which the fluidic channel pressure starts to increase during the liquid loading. After this infection point, the fluidic channel pressure increases until liquid flow ends. Furthermore, normalized flow momentum (=u·L) during the liquid loading process will vary with different distances between channels. The normalized flow momentum peaks in the beginning of pumping and will decrease after reaching the inflection point.

The mechanism shown in FIG. 6A through FIG. 6C provides bubble-free loading and filling of dead end chambers. The mechanism also allows for the elimination of bubbles that may form in the channels from inconsistent loading when used in combination with a pressure driven system. The mechanism also allows for microfluidic chip designs that have temporal control over movements of fluids from chambers to channels, for example, at different positions on the chip. The mechanism also permits the creation of a sequence of movements of different durations over time by segmenting the degas network and selectively actuating the segments.

An alternative embodiment of the apparatus 10 is illustrated in FIG. 7 and FIG. 8. The apparatus is a laminate where the fluidic microchannel network 40 and the degas microchannel network 42 are formed in different layers separated by a gas permeable barrier layer 44. The degas channels 42 and the microfluidic channels 40 are still proximal to each other but are not formed in the same matrix in this embodiment. The degas channel network 42 can be associated with all or only part of the fluidic microchannel network 40. The degas channel network 42 can also be divided into sections or modules that can be activated sequentially to move material in the fluidic network 40 to different locations on the device over time. The fluidic microchannel network 40 is also connected to one or more inlets 50.

The vacuum source in the illustration of FIG. 7 is a thumb-pump 46 and umbrella valve 48 coupled to the proximal degas microchannel network 42. However, any vacuum source can be used to evacuate the degas network of channels and/chambers. The evacuation of the degas network 42 with the actuation of the thumb-pump 46 causes the sample liquid from inlet 50 to enter and occupy the fluidic microchannel network 40.

FIG. 8 is a schematic cross-sectional view of the laminate of a section of the apparatus of FIG. 7. In this embodiment, the laminate has a fluidic network 40 formed in a fluidic matrix 52 that is mounted to a support substrate 54. The support substrate is preferably non-permeable to gas or liquids and made from a material such as glass, gas impermeable thermoplastics, or acrylic, etc. The fluidic matrix 52 can be made of either a gas permeable material like PDMS or a gas impermeable material like COC. The microfluidic device laminate can have multiple layers bonded together through chemical modifications such as oxygen plasma activation and silane coupling group modification.

The fluidic network 40 can include any combination of microfluidic structures, such as chambers, valves and channels, which may be formed in the fluidic matrix 52. The dimensions of the fluidic channels 40 in the fluidic matrix 52 can be varied and optimized for particular applications. Preferred fluidic channel 40 widths and heights for the embodiment shown in FIG. 7 and FIG. 8 range from approximately 30 μm to approximately 250 μm and approximately 30 μm to approximately 250 μm respectively.

A gas permeable barrier layer 44 is placed over the channels and chambers of the fluidic network 40 to enclose and form the structures. The gas permeable layer 44 is preferably a layer ranging from approximately 50 μm to approximately 400 μm to produce a broad range of flow rates.

A degas matrix 56 with a network 42 of degas microchannels and structures is disposed on the gas permeable barrier 44. The degas matrix 56 can be composed of either a gas permeable material or a gas impermeable material. The degas matrix 56 material can be rigid or flexible and resilient. The degas microfluidic network 42 can be formed in the degas matrix 56 by conventional techniques that are appropriate for the degas matrix material that is selected.

The thickness of the fluidic matrix 52 and degas matrix 56 layers can also vary. The matrix layers preferably have a thickness ranging from approximately 2 mm to approximately 8 mm with a thickness of approximately 4 mm particularly preferred.

In one embodiment, the fluidic matrix is a gas impermeable matrix and the degas matrix is a gas impermeable matrix of a material such as synthetic rubber, Butynol and cyclic olefin copolymer (COC).

In another embodiment, the fluidic matrix is a gas impermeable matrix material and the degas matrix is a gas permeable matrix material such as polydimethylsiloxane (PDMS), polymethylpentene (PMP), silicone elastomers, thermoplastic elastomers, gas permeable thermoplastics and rubber.

In the embodiment shown in FIG. 8, the degas microchannels have a top support layer 58 over the degas matrix 56, to form the microchannel when the microstructure transects the degas matrix layer. In another embodiment, the microstructure network 42 does not transect the matrix 56 and the network is formed completely within the matrix and no top substrate 58 is required to enclose open network structures. In another embodiment, the top support layer 58 is made from a resilient impermeable material that can be used with a thumb-pump 46 and can seal the top surface of the device. The preferred thickness of a thumb-pump 46 silicone elastomeric membrane 58 ranges from approximately 0.05 mm to approximately 1.2 mm.

The technology described herein may be better understood with reference to the accompanying examples, which are intended for purposes of illustration only and should not be construed as in any sense limiting the scope of the technology described herein as defined in the claims appended hereto.

EXAMPLE 1

In order to demonstrate the operational principles of the apparatus and methods, simulations were performed to validate the theoretical models, and to understand the effect of various design parameters on fluid actuation and to determine the specific correlations between the key parameters. Two different types of simulations were performed: 1) an investigation into how different parameters influence fluid flow assuming constant pressure in the degassing channel network; and 2) an analysis of different thumb-pump parameters for the comparison of pressures obtainable within the degas channel network using the schematic structure shown in FIG. 5.

Based on the theoretical model using the schematic structure shown in FIG. 4, the three main parameters that were varied for the characterization study were the barrier thickness d, the fluidic channel width w, and the applied negative pressure in the degas channel network $P_d$. For the simulations, the total fluidic channel length was 263 mm, and the observed channel length is 240 mm. The fluidic channel height was 30 μm and the channel width is 100 μm.

To find the specific correlation between the flow velocity and the proximity "d," simulations for different proximities were carried out. Proximities of 33.3 μm, 40 μm, 50 μm, 62.5 μm, 83.33 μm, 125 μm and 250 μm were considered in simulations with different degas pressure conditions ranging from −30 kPa to −70 kPa.

Simulation results of different distances between the degas channel and fluidic channel networks (i.e. proximity) indicate that larger distances lead to slower liquid loading.

Simulation results of the variation of channel pressure as a function of time for different proximity illustrated that fluidic pressure decreases with increasing proximity. In addition, after a certain period of time the compression of the air left in the channel leads to an increase in channel pressure.

To find the specific correlation between the flow velocity and the barrier thickness "d," simulations of different barrier thicknesses were carried out. Barrier thicknesses of 33.3 μm, 40 μm, 50 μm, 62.5 μm, 83.33 μm, 125 μm and 250 μm were considered in simulations with different degas pressure conditions ranging from −30 kPa to −70 kPa.

Varying the fluidic channel width "w" will also change the diffusion area to volume ratio which may be crucial for the degassing process. Therefore, the effect of fluid channel width "w" and the corresponding degassing surface area to fluid channel volume ratio (referred to as SAVR) was also simulated.

Although variations in the fluidic channel width cause changes in channel volume and flow resistance (viscous and capillary forces), simulations show that channels with widths ranging from 50 μm to 125 μm have similar liquid loading times while wider fluidic channels started to deviate from the group and require longer filling times.

Simulation results showing the variation of channel pressure as a function of time for different channel widths demonstrated that decreasing channel width results in decreasing fluidic pressures. However, after a certain time, the compression of the air left in the channel leads to an increase in channel pressure.

Simulation results of normalized fluid momentum plotted as a function of time for different channel widths shows that the normalized fluid momentum follows the trend of the relative channel pressure (i.e. $P_{atm}-P_{fc}$), as also predicted by the theoretical model. However, the change in normalized momentum is less pronounced than the channel pressure for low channel widths due to capillary pressure at the advancing meniscus.

Using the normalized momentum as a measure of relative channel pressure ($P_{fc}-P_{atm}$), it was also observed that the channel pressure decreases with a decrease in channel width. The normalized fluid momentum was further analyzed as a function of the volume fraction of the channel that is filled with the fluid for different channel widths. It was observed that while relative channel pressure increases (i.e. channel pressure decreases) with decreasing channel widths, after a certain volume fraction of the channel is filled up with the fluid, the compression of the air left in the channel leads to an increase in channel pressure (and hence leads to a decrease in the relative channel pressure and normalized momentum).

The effect of the applied degas pressures $P_d$ on the microfluidic Proximal Degas-driven flow was also evaluated by simulation. The degas pressure $P_d$ versus average flow velocity was simulated for different proximity for degas pressures $P_d$ of −20 kPa, −30 kPa, −40 kPa, −50 kPa, −60 kPa, −70 kPa and −80 kPa. A negative linear correlation was found between the two parameters, as degas pressure was reduced the average flow rate increased.

Simulation results of the variation of channel pressure as a function of time for different applied pressures demonstrated that fluidic pressure decreases with decreasing applied pressure. The normalized fluid momentum was calculated and plotted as a function of time as well as plotted as a function of the volume fraction (of the channel) filled (with the fluid) for different pressures. Using the normalized momentum as a measure of relative channel pressure ($P_{fc}-P_{atm}$), it was observed that the channel pressure decreases with a decrease in applied pressure.

EXAMPLE 2

Many options exist for the source of reduced pressure which can be used for the device. For the initial characterizations a vacuum pump (with a bleed valve) was used to apply a measured and controlled vacuum pressure. This technique is ill suited for point of care testing applications and therefore a standalone device using an integrated membrane thumb-pump as the vacuum source was designed and simulated.

Simulations were performed that coupled fluidic actuation with an integrated on-chip finger operated membrane pump as shown schematically in FIG. 1C and FIG. 3. The membrane deflection pushes air out of a one-way air valve and its subsequent relaxation pulls out air from the degas lines generating a vacuum in the channels.

The diameter of thumb-pump chamber and the thickness of the silicone membrane were two parameters that were varied for the integrated thumb-pump structure simulations. The simulated thumb-pump chamber height was 4 mm, membrane thickness was 0.81 mm (0.032 inch), the pump chamber diameter was 12 mm, and the button diameter was 2 mm less than the chamber diameter. The relative vacuum pressures generated by the thumb-pump with different chamber diameters or membrane thicknesses were simulated. The relative vacuum pressures that were created ranged from ~−57 kPa to ~−65 kPa when the membrane thickness was between 0.30 mm (0.012 inch) to 1.57 mm (0.062 inch). When the thumb-pump chamber diameter varied from 6 mm to 12 mm, the relative vacuum generated increased from ~−40 kPa to ~−65 kPa. The simulations were performed under the assumption that fluid flow was achieved with full press and release actuation of the thumb-pump button.

Simulation results indicate that larger thumb-pump chamber diameters create larger initial vacuum pressures and variations in the membrane thickness do not cause significant pressure changes. However, an optimum membrane thickness exists that has adequate thickness to prevent vacuum loss through the membrane yet thin enough such that the membrane conforms to the chamber geometry upon depression.

EXAMPLE 3

The experimental validation of the simulations of Example 1 was done by the simultaneous measurement of pressure and fluid momentum in a dead end channel. Devices were fabricated using standard soft lithography processes. Multiple parameters were considered such as the distance between the degas channel network and the fluidic channel network (i.e. proximity), the channel width, and the relative vacuum pressure in the degas channel network. Thumb-pump simulations were also validated experimentally.

Devices with structures with different barrier layer thicknesses, channel widths and channel lengths were fabricated. To produce a device structure, a SU-8 (MicroChem Corp.) mold was first fabricated on a silicon wafer using contact photolithography. The requisite height of 30 μm was obtained with a tolerance of around 10%. The mold was then hard baked and silanized using Trichloro(1H,1H,2H,2H-perfluorooctyl)silane (Sigma Aldrich). The PDMS (Dow Corning Corp.) base and curing agents were then mixed in a ratio of 10:1, degassed, and poured on top of the mold. Once the PDMS was cured, it was peeled off and the inlets and outlets were punched. The PDMS device was then bonded to a plain glass surface using $O_2$ plasma bonding (20 W, 30 sec, 0.2 Torr).

Proximal Degas-driven Flow devices consisted of an additional membrane thumb-pump consisting of a silicone membrane (Stockwell Elastomerics) and an elastic umbrella valve (Minivalve International). There were three steps in the device assembly process for the integrated devices. First, the silicone membrane was bonded with PDMS bulk, by oxygen plasma treatment at 25 W for 60 seconds. This was followed by bonding the PDMS-silicone component with a glass substrate. Third, the umbrella valve was inserted into the chip manually.

For the liquid flow characterizations, deionized water and food dye (FD&C Red 40, Safeway Inc.) were mixed in the ratio of 1:1 and the solution was used to characterize the μSIP devices. For the device characterization using an external vacuum source, 50 μL of dye solution was added to the chip inlet and the devices were connected to a variable vacuum source using Tygon tubing. Vacuum pressure was applied to the degas channels (−30 kPa unless specified otherwise) and the fluid flow was observed under a microscope (Axio Zoom, Zeiss) under bright field with image acquisition.

For the integrated device characterization, an on-chip membrane pump was used instead of the external vacuum source. Acrylic buttons were used to manually press the pump followed by image acquisition. Image J (NIH) was used to calculate the liquid flow velocity based on the images taken in the experiments. The pressure inside the microfluidic channel was monitored using a miniature pressure transducer (Kulite XCL-080), with a linear pressure-voltage response in the −20 kPa to −70 kPa range, connected to a data acquisition board (My DAQ, National Instrument) and using the Labview software; while the liquid flow into the microchannels was being imaged and recorded.

Both the pressure measurement and the liquid flow observation were started at the same time point, at the same sampling frequency. The normalized liquid flow momentum was calculated based on the process data, and was correlated with the channel pressure data. The image data was processed to evaluate the position of the liquid meniscus which was then used to calculate the velocity and momentum of the liquid plug. The momentum of the fluid was then plotted against the measured pressure data. The linear correlation between the fluid momentum (normalized to the fluid density and channel cross section area) and the channel pressure confirmed the conclusions of the theoretical model.

The time-dependent movement of the liquid loading process indicated that the liquid flow momentum is proportional to the fluidic channel pressure. The factors that increased fluid flow rates include: greater relative vacuum pressures within the degas channel "$P_d$," decreasing the distance between the degas channel and the fluidic channel networks "d," and increasing the fluidic channel width "w." There is a linear trend between the relative channel pressure and the normalized flow momentum in tests with different fluidic channel widths. This trend was further observed in tests with different barrier thicknesses (proximities).

The effect of PDMS device thickness on pSIP was also evaluated. The average initial velocity of the devices was measured for devices with different device thicknesses. It was observed that for device thickness less than 1 mm (~180 μm) the flow velocity was drastically reduced, while a faint dip in flow velocities were observed for thickness more than 4 mm. The reduction in flow velocities for thin devices can be attributed to the diffusion of atmospheric air into the fluid channels.

The fluid channel length 'L' was also varied while the channel width and the proximity of the degas channels was kept constant to evaluate the effect of fluid channel length (and hence the channel volume) on μSIP. It was observed that after a certain volume fraction of the fluid channel fills up with the fluid, the compression of the air left in the channel leads to an increase in channel pressure. This is due to the fact that for longer channel lengths the air outflux takes place for a longer time before the air compression due to fluid filling becomes significant.

The initial decrease in channel pressure at the initiation of fluid actuation was followed by an increase after a certain threshold volume of the fluidic channel was filled. The minimum fluidic pressure achieved was found to increase at greater proximity distances "d" between the channels and at higher degas pressures $P_d$. This can be ascribed to the decrease in diffusive air flux through the barrier as the distance between channels and degas pressure is increased. Experimentally, the fluidic momentum was found to have an asymmetrical inversed saddle shape suggesting that the liquid flow velocity reaches its maximum at the beginning of the process and decreases afterwards.

EXAMPLE 4

To further demonstrate the apparatus and methods, the proximal degas-driven microfluidic loading devices and process were tested with an off-chip vacuum source that could be preset to specified negative pressures; and 2) the device parameters were then characterized with the integrated thumb-pump vacuum source. Variations of thumb-pump chamber diameter and membrane thickness were also evaluated.

All devices were made using standard PDMS soft lithography. PDMS was cured on a mold, the fluidic inlet thumb-pump chamber, and vent for the one-way valve were punched out of the bulk, the silicone membrane was Oxygen plasma treated and bonded to the top-side of the bulk PDMS device, and the feature-side of the device was irreversibly bonded to a glass substrate using UV treatment. Devices were kept in an incubator for +24 hours after surface treatment and bonding such that original surface characteristics were recovered. Inadequate bonding between the PDMS and glass substrate was required as any channel leakage caused the device to fail. Diluted food dye was used as the sample liquid for all experiments to enhance channel visualization and enable automated image processing. All experimental observations were performed with a Zeiss AxioZoom V16 microscope and measurements were determined by using Image-J software to analyze movies of the fluid flow.

Experimental results for devices tested by applying a constant vacuum source to the degas channel network demonstrated similar trends as calculated by the simulation model. Each condition was tested with three to ten different chip devices. The varied parameters were the relative vacuum pressure within the degas channel $P_d$, the distance between the degas channel and the fluidic channel d, and fluidic channel width w. The factors that increased fluid flow rates include: greater relative vacuum pressures within the degas channel, decreasing the distance between the degas channel and the fluidic channel networks, and decreasing the fluidic channel width (but kept wide enough to minimize capillary pinning).

Experimental characterization of the thumb-pump integrated device was performed with devices of varying design parameters. The two parameters of the membrane thumb-pump that were varied for the simulations and experiments were the thickness 30 of the PDMS sealing membrane 26 and the pump chamber diameter 32 as shown schematically in FIG. 3. The proximal degas channel network 16 was connected to the integrated membrane thumb-pump which was used to generate the vacuum on the chip. An elastic umbrella valve 22 was used as a one-way air valve and a button 20 was used to ensure identical thumb-pump performance between users.

Data generated from functional devices with an integrated thumb-pump was evaluated. Variations in the thumb-pump chamber diameter 32 and membrane thickness 30 were found to alter fluid flow. Average flow velocity was plotted versus membrane thicknesses and pump chamber diameter. A thumb-pump membrane thickness of 0.8 mm produced the largest reduction in fluidic channel pressure and the highest flow velocity was achieved based upon the current designs.

The effect of membrane thickness 30 revealed slightly different results than the simulation prediction. The differences between the experimental results and simulation data may be accounted by: 1) thicker membranes (1.322 mm and 1.575 mm) are more rigid and cause greater variation because a larger pressing force is required for fluid actuation; 2) upon depression of the button, the chamber may have experienced greater deformation because thicker membranes may have filled the 2 mm gap between the button and chamber diameters; 3) thinner membranes (0.254 mm and 0.509 mm) were more susceptible to air diffusion through the membrane into the pump chamber reducing the relative vacuum pressure inside the degas channels and ultimately slowing fluid flow.

Greater pump chamber diameters generated more relative vacuum and consequently greater fluid flow rates. An increase in chamber diameter led to the generation of lower vacuum pressures, except chambers with diameters smaller than 6 mm. Membrane deformation of pump chambers with smaller diameters caused unexpected and inevitable deformation of the nearby parts of the chip.

An optimized design consisting of fluidic channels 250 μm in width, 30 μm in height, with a proximity of 50 μm formed in PDMS matrix that is 4 mm in thickness, with a thumb pump diameter of 10 mm and membrane thickness of 0.8 mm led to flow rates of ~5 mm/sec was determined.

The results validated the theoretical model of the thumb-pump and valve and demonstrated the capability of tuning the fluid flow attained by varying the thumb-pump dimensional parameters. Additionally, the reproducibility of device results was tested with five different operators, each testing two devices. The tests also illustrate how portable devices can be designed with high reproducibility to have microfluidic networks with predetermined fluid flow.

EXAMPLE 5

To demonstrate rapid sample loading and air bubble and plug elimination, a degas network of 880 dead-end chambers and channels totaling more than 170 mm in length were prepared on demonstration chips. The height of channels and chambers were 30 μm, the width of channels was 100 μm, and the chamber diameter was 300 μm. Air bubbles and plugs were intentionally introduced into the degas channel network to simulate air bubble formation that often occurs with pressure-driven fluid flow.

A pressure-driven flow was employed to introduce air bubbles/plugs into the fluidic channel network. Thereafter, the thumb-pump was activated to illustrate the elimination of the air bubbles/plugs and gas removal during the liquid pumping process. Thumb-pump activation occurred at time zero. Air bubbles/plugs initially shrink due to air diffusion into the degas channel and fluid flow resumed after approximately 79 seconds. All air bubbles/plugs disappeared after approximately 99 seconds from the fluid plug.

The capability of causing air bubbles/plugs to shrink and disappear by applying a vacuum to the degas channel network also allows the device to be combined with pressure driven microfluidic structures that may produce air bubbles. The apparatus can therefore interface with the requirements of more complex assays and advance the capabilities of point-of-care tests, diagnostic analysis, and environmental monitoring technologies.

EXAMPLE 6

Rather than a lateral arrangement, fluidic and degas channel networks were arranged side by side in a horizontal fashion. This produced an alternative configuration where two channels with a vertical arrangement of the fluidic and degas channel networks was developed. In this particular embodiment, the two channel networks were not formed into the same matrix, but were formed in two separate matrices (made up of the same or different materials). These matrices may be gas permeable like PDMS or gas impermeable like COC, or Pressure Sensitive Adhesives (PSA), etc.

The two fluidic channels were then arranged in a vertical manner with an intervening wall of gas-permeable material. This gas permeable material allows the diffusion of air out of the fluidic channel and into the degas channel, and fluid flow is actuated with principles similar to lateral arrangement discussed above.

The chip was created by using a laminated structure. The fluidic and degas channels were laser cut into Pressure Sensitive Adhesives (PSA). The PSA cut channels were then adhered to an acrylic base material. These two layers were then aligned on top of each other with a silicone elastomeric membrane sandwiched in between. The thinnest silicone elastomeric membrane used was around 125 µm thick and led to fluid flow when the degas channels were exposed to a negative pressure.

From the discussion above it will be appreciated that the technology described herein can be embodied in various ways, including the following:

1. A microfluidic apparatus, comprising: (a) an optional gas impermeable base; (b) a gas permeable matrix mounted to the base; (c) at least one network of interconnected fluidic structures formed in the matrix with at least one input fluidic channel; (d) at least one network of degas microchannels located in proximity to the network of fluidic structures formed in the matrix; and (e) means for evacuating the degas microchannel network; wherein gases located in the network of fluidic structures diffuse into the evacuated degas channels creating a negative pressure and movement of fluid in the input fluidic channels and fluidic structures.

2. The apparatus as recited in any previous embodiment, wherein the gas permeable matrix is a material selected from the group of materials consisting essentially of polydimethylsiloxane (PDMS), polymethylpentene (PMP), silicone elastomers, thermoplastic elastomers and rubber.

3. The apparatus as recited in any previous embodiment, wherein the means for evacuating the degas microchannel networks comprises an external vacuum source selected from the group of a mechanical pump and a handheld bulb pump.

4. The apparatus as recited in any previous embodiment, wherein the means for evacuating the degas microchannel networks comprises an integrated on-chip vacuum source with a membrane thumb pump and a one way air valve.

5. The apparatus as recited in any previous embodiment, wherein the evacuated degas microchannel network pressure is in the range of between −30 kPa and −90 kPa gauge.

6. The apparatus as recited in any previous embodiment, further comprising: a membrane coupled to the gas permeable matrix.

7. The apparatus as recited in any previous embodiment, wherein the membrane comprises a gas impermeable membrane made from materials selected from the group of materials consisting of synthetic rubber, Butynol and cyclic olefin copolymer (COC).

8. The apparatus as recited in any previous embodiment, wherein the membrane has a thickness of between 0.05 mm and 2 mm.

9. The apparatus as recited in any previous embodiment, wherein the fluidic microchannel networks have channel widths and heights within the range of between 30 µm and 250 µm.

10. The apparatus as recited in any previous embodiment, wherein the proximity between the fluidic and degas microchannel networks is in the range of between 50 µm and 400 µm.

11. A microfluidic apparatus, comprising: (a) a optional support base; (b) a first matrix mounted to the support base, the first matrix having at least one network of interconnected fluidic structures formed in the matrix connected to at least one input fluidic channel; (c) a gas permeable barrier coupled to the first matrix; (d) a second matrix mounted to the gas permeable barrier, the second matrix having at least one network of degas microstructures; and (e) a vacuum source operably coupled to the network of degas microstructures configured to evacuate the degas network; wherein the network degas microstructures are located in proximity to the network of fluidic structures separated by the gas permeable barrier; and wherein gases located in the network of fluidic structures diffuse into the evacuated degas microstructures through the gas permeable barrier creating a negative pressure and movement of fluid in the input fluidic channels and fluidic structures.

12. The apparatus as recited in any previous embodiment, further comprising: a membrane coupled to the second matrix.

13. The apparatus as recited in any previous embodiment, wherein the membrane comprises a gas impermeable membrane made from materials selected from the group of materials consisting of synthetic rubber, Butynol and cyclic olefin copolymer (COC).

14. The apparatus as recited in any previous embodiment, wherein the membrane has a thickness of between 0.05 mm and 2 mm.

15. The apparatus as recited in any previous embodiment, wherein the gas permeable barrier is a material selected from the group of materials consisting of elastomers, silicone elastomers, thermoplastic elastomers, polymethylpentene (PMP), gas permeable thermoplastics and rubber.

16. The apparatus as recited in any previous embodiment, wherein the first matrix is a gas impermeable matrix and the second matrix is a gas impermeable matrix selected from the group of materials consisting of synthetic rubber, Butynol and cyclic olefin copolymer (COC).

17. The apparatus as recited in any previous embodiment, wherein the first matrix is a gas impermeable matrix material selected from the group of materials consisting of synthetic rubber, Butynol and cyclic olefin copolymer (COC) and the second matrix is a gas permeable matrix material selected from the group of materials consisting of polydimethylsiloxane (PDMS), polymethylpentene (PMP), silicone elastomers, thermoplastic elastomers and rubber.

18. The apparatus as recited in any previous embodiment, wherein the vacuum source for evacuating degas microchannel networks comprises an integrated on-chip vacuum source of a membrane thumb pump and a one way air valve.

19. A method for actuation of a microfluidic device apparatus, comprising: (a) providing a microfluidic device comprising: (i) a microfluidic channel network and a degas channel network separated by at least one gas permeable wall; (ii) at least one solution inlet coupled to the microfluidic channel network; and (iii) a vacuum source configured to remove air from the degas channel network; (b) placing a fluid into the solution inlet; (c) evacuating gasses out of the degas channel network with the vacuum source; and (d)

allowing gases within the input fluidic channel to diffuse into the degas channels through gas permeable walls and decrease the pressure in the fluidic channel thereby causing the fluid in the solution inlet to move through the microfluidic structures of the array.

20. A method as recited in any previous embodiment, further comprising: optimizing the fluidic channel geometry; optimizing the degas channel geometry; and optimizing the wall thickness between the input fluidic channels and the degas channels for rapid and bubble free fluid flow over time.

21. A microfluidic apparatus, comprising: (a) a first matrix having at least one network of interconnected fluidic structures, formed in the matrix, connected to at least one input fluidic channel; (b) a gas permeable barrier coupled to the first matrix and its fluidic structures; (c) a second matrix mounted to the gas permeable barrier, the second matrix having at least one network of degas microstructures coupled to the gas permeable barrier; and (d) a vacuum source operably coupled to the network of degas microstructures configured to evacuate the degas network; wherein the network degas microstructures are located in proximity to the network of fluidic structures separated by the gas permeable barrier; and wherein gases located in the network of fluidic structures diffuse into said evacuated degas microstructures through the gas permeable barrier creating a negative pressure and movement of fluid in the input fluidic channels and fluidic structures.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A microfluidic apparatus, comprising:
   (a) a first matrix having at least one network of interconnected fluidic structures formed in the matrix connected to at least one input fluidic channel;
   (b) a gas permeable barrier coupled to the first matrix;
   (c) a second matrix mounted to the gas permeable barrier, the second matrix having at least one network of degas microstructures; and
   (d) a vacuum source operably coupled to the network of degas microstructures configured to evacuate the degas network;
   wherein the network degas microstructures are located in proximity to the network of fluidic structures separated by the gas permeable barrier; and
   wherein gases located in the network of fluidic structures diffuse into said evacuated degas microstructures through the gas permeable barrier creating a negative pressure and movement of fluid in the input fluidic channels and fluidic structures.

2. An apparatus as recited in claim 1, further comprising a membrane coupled to the second matrix.

3. An apparatus as recited in claim 2, wherein the membrane comprises a gas impermeable membrane made from materials selected from the group of materials consisting of synthetic rubber, Butynol and cyclic olefin copolymer (COC).

4. An apparatus as recited in claim 2, wherein the membrane has a thickness of between 0.05 mm and 2 mm.

5. An apparatus as recited in claim 1, wherein said gas permeable barrier is a material selected from the group of materials consisting of elastomers, silicone elastomers, thermoplastic elastomers, polymethylpentene (PMP), gas permeable thermoplastics and rubber.

6. An apparatus as recited in claim 1, wherein said first matrix is a gas impermeable matrix and said second matrix is a gas impermeable matrix selected from the group of materials consisting of synthetic rubber, Butynol and cyclic olefin copolymer (COC).

7. An apparatus as recited in claim 1, wherein said first matrix is a gas impermeable matrix material selected from the group of materials consisting of synthetic rubber, Butynol and cyclic olefin copolymer (COC) and said second matrix is a gas permeable matrix material selected from the group of materials consisting of polydimethylsiloxane (PDMS), polymethylpentene (PMP), silicone elastomers, thermoplastic elastomers and rubber.

8. An apparatus as recited in claim 1, wherein said vacuum source for evacuating degas microchannel networks comprises an integrated on-chip vacuum source of a membrane thumb pump and a one way air valve.

* * * * *